Sept. 2, 1969  A. A. HEYMAN  3,464,260
CRUSHABILITY TESTER

Filed April 17, 1967  4 Sheets-Sheet 3

INVENTOR
ALBERT A. HEYMAN

BY *Albert J. Kramer*
ATTORNEY

Sept. 2, 1969        A. A. HEYMAN        3,464,260
CRUSHABILITY TESTER
Filed April 17, 1967        4 Sheets-Sheet 4
FIG. 4.
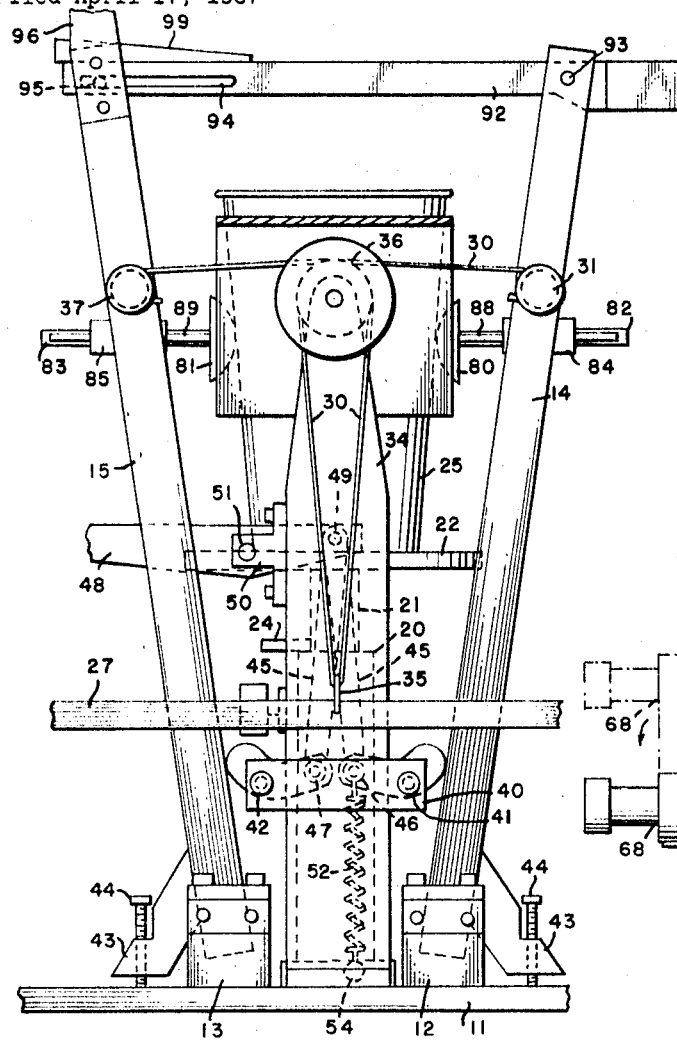
FIG. 5.
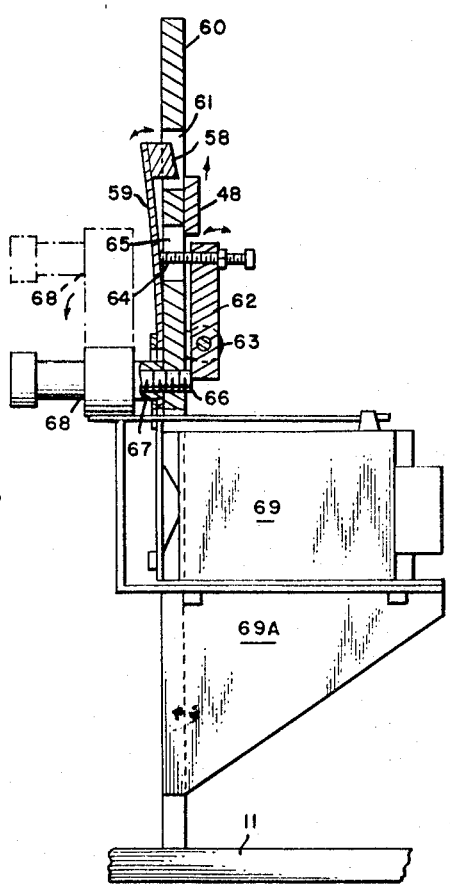
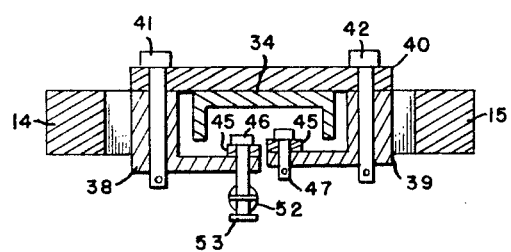
FIG. 6.
INVENTOR
ALBERT A. HEYMAN
BY *Albert J. Kramer*
ATTORNEY United States Patent Office 3,464,260
Patented Sept. 2, 1969

3,464,260
CRUSHABILITY TESTER
Albert A. Heyman, Baltimore, Md., assignor to Maryland Cup Corporation, Owings Mills, Md., a corporation of Maryland
Filed Apr. 17, 1967, Ser. No. 633,353
Int. Cl. G01n 3/08, 3/20
U.S. Cl. 73—94                                 10 Claims

ABSTRACT OF THE DISCLOSURE

A device for testing the crushability of various products such as cups of paper, plastic, etc. is provided. The device comprises a pair of swinging arms between which the object to be tested is mounted on an elevationally adjustable platen. Adjustable abutments are provided on the arms for contacting the article to be tested. A weighted lever is connected to the arms for urging them together. Movable means comprising a force spring and a dash pot are provided for attenuating the forces acting on the arms through the weighted lever. Means are also provided for limiting the period during which a test is conducted for standardization purposes comprising a trip mechanism, a solenoid, a time switch and a brake. Measurements are made through a displacement gauge on one of the arms acting against a wedge on the other arm.

---

This invention relates to testing apparatus and it is more particularly concerned with apparatus for testing the crushability of articles of relatively soft materials, such as of paper, plastic sheets and others.

An object of the invention is the provision of apparatus by means of which the crushability of articles may be determined in relation to a given standard of quality.

Another object is the provision of apparatus specifically adapted to determine the crushability of tubular products such as cups of paper, plastic and of other products.

A still further object is the provision of apparatus for the purpose indicated which is accurate and reliable.

These and still further objects, advantages and features of the invention will be apparent from the following description considered together with the accompanying drawing.

In the drawing:

FIG. 4 is a rear elevational view of a fragmentary portion of the embodiment partly in section.

FIG. 5 is a sectional view along the line 5—5 of FIG. 1.

FIG. 6 is a sectional view along the line 6—6 of FIG. 1.

Figure 1:
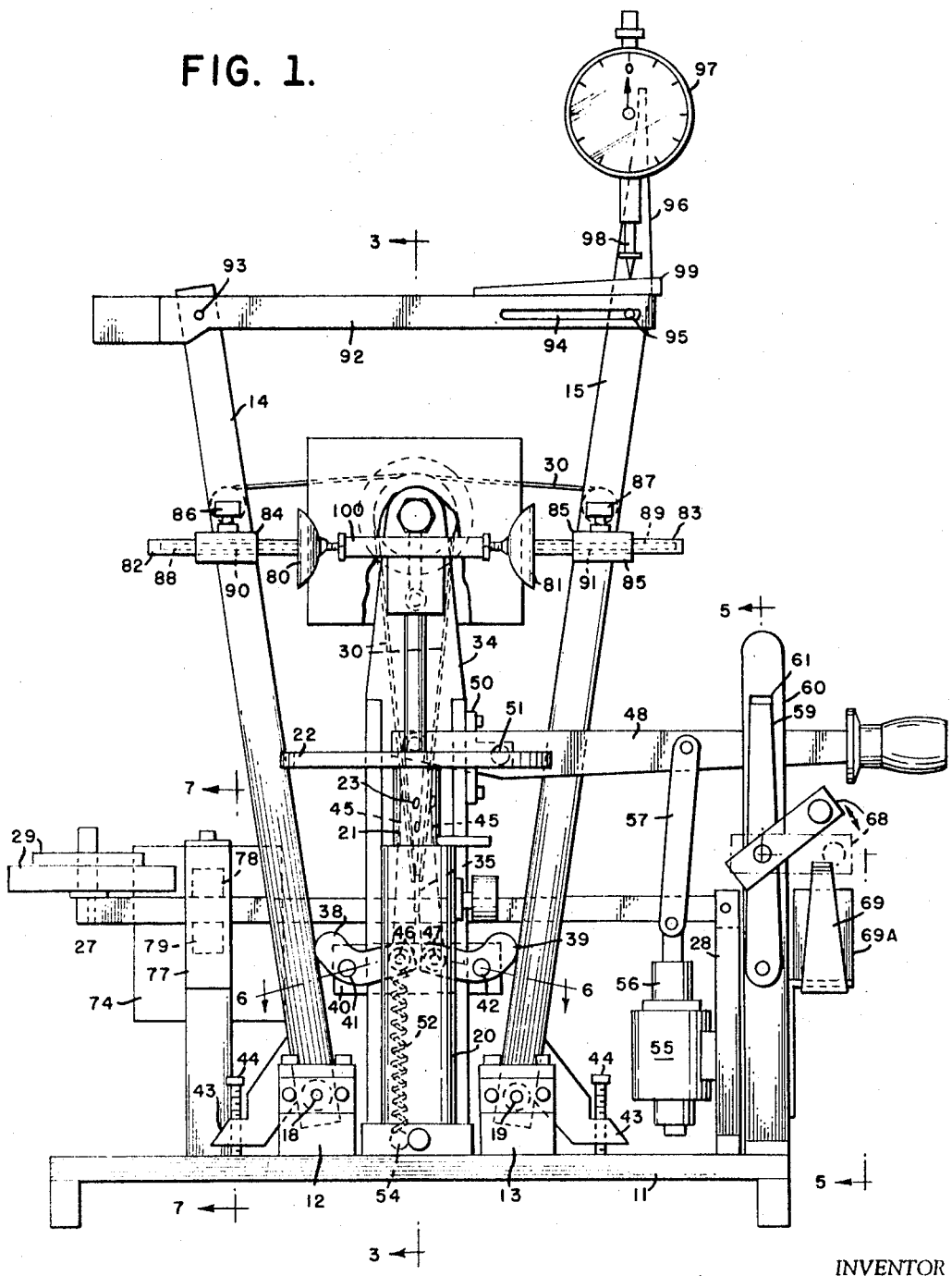
FIG. 1 is a front elevational view of an embodiment of the invention in its initial position, showing the relative position of the spacer gauge before removal.
Figure 2:
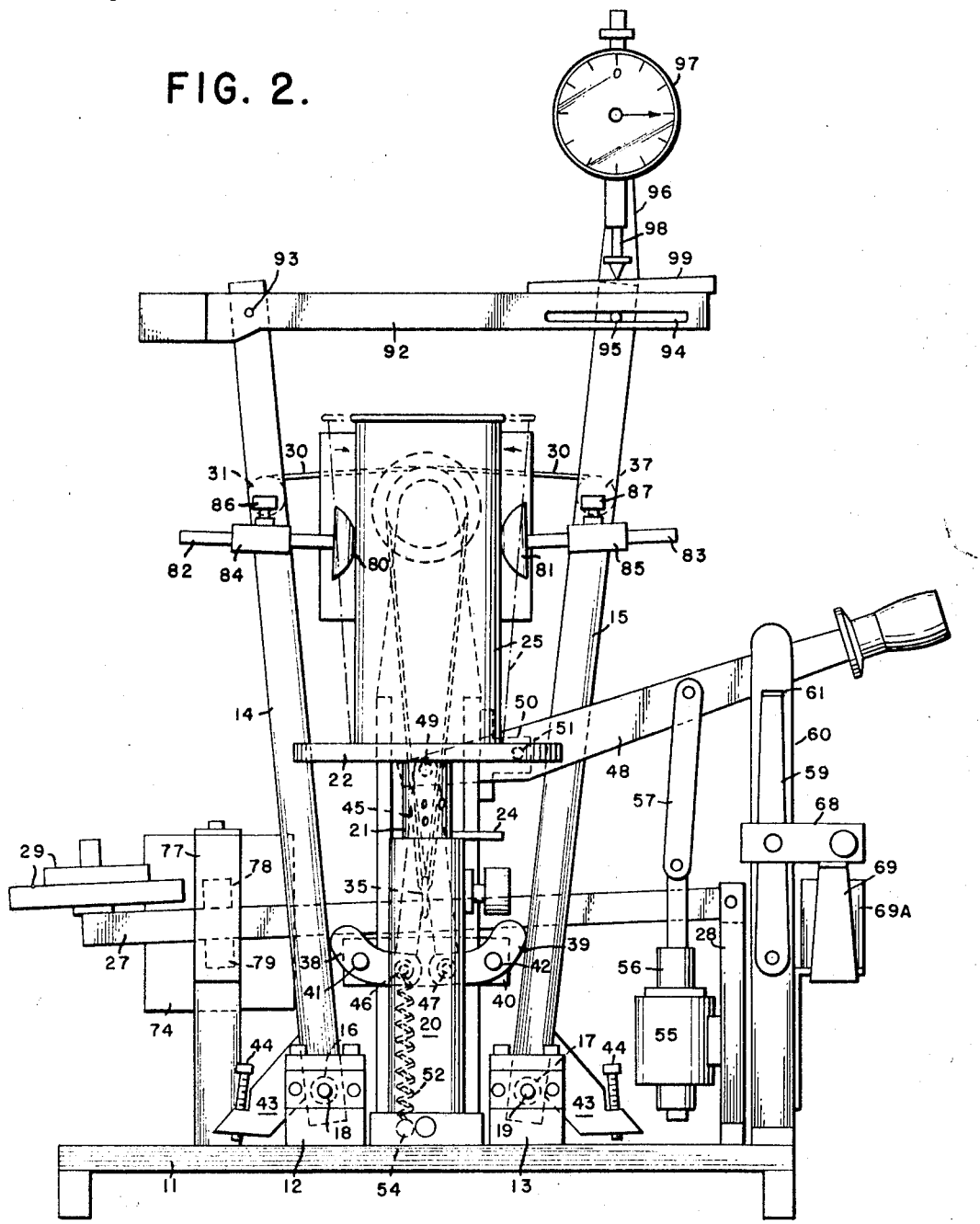
FIG. 2 is a view similar to FIG. 1 with the apparatus in an actual test operation.
Figure 3:
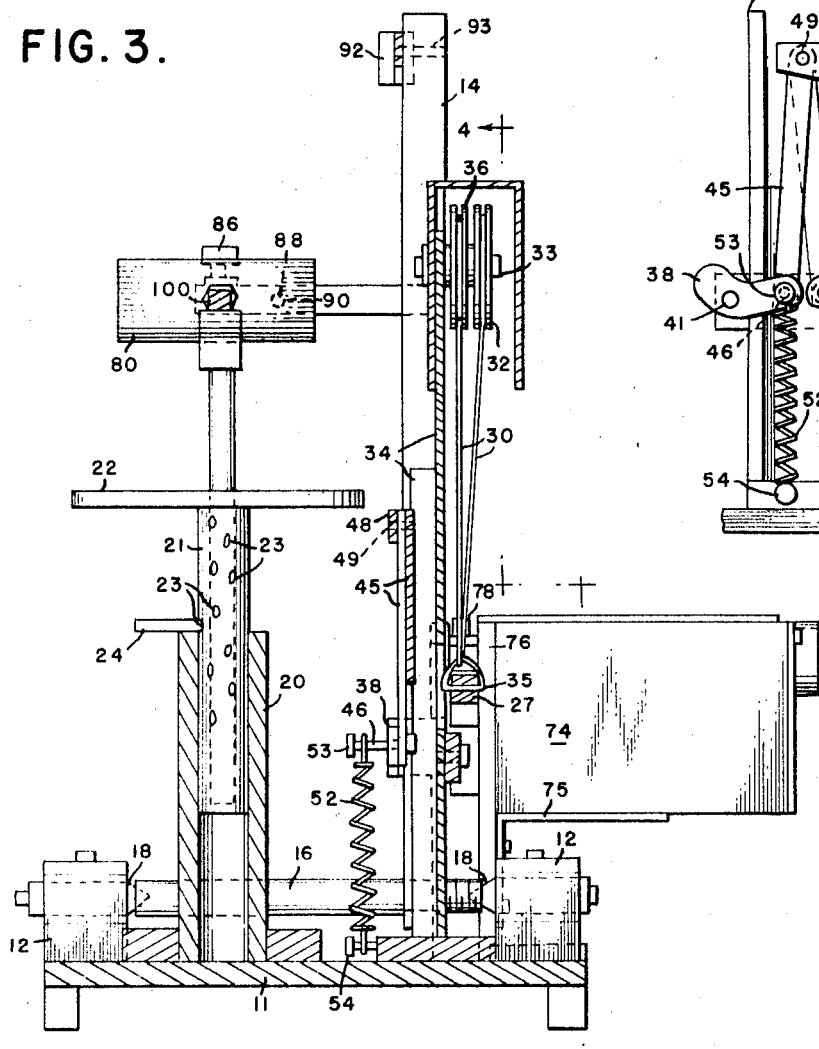
FIG. 3 is a vertical sectional view along the line 3—3 of FIG. 1.
Figure 8:
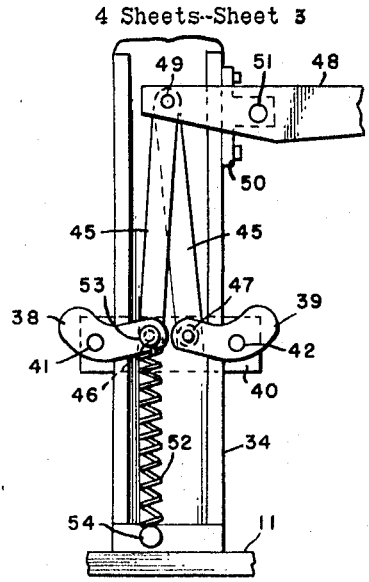
FIG. 8 is a fragmentary schematic view illustrating the linkage related to the bell cranks 38 and 39.
Figure 7:
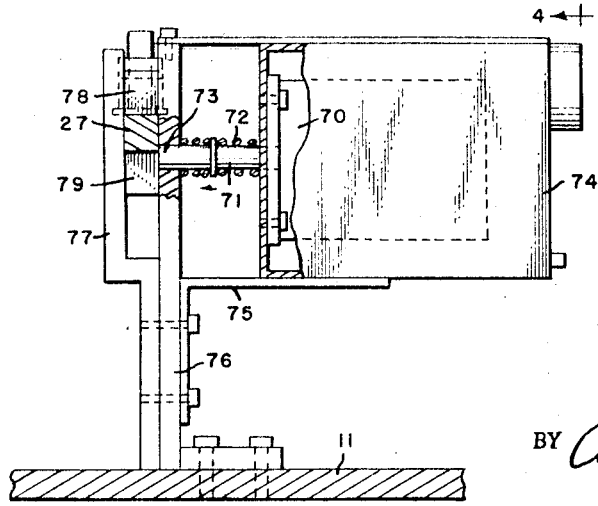
FIG. 7 is a sectional view along the line 7—7 of FIG. 1.

Referring with more particularity to the drawing, the embodiment illustrated comprises a base member 11 having a right and a left pair of front and rear spaced pillow blocks 12, 12 and 13, 13 fixed thereto. The lower ends of vertical arms 14 and 15 are connected to rods 16 and 17 pivoted to the blocks 12, 12 and 13, 13, respectively, on conical bearings 18, 18 and 19, 19.

Between the spaced pairs of blocks a standard 20 is fixed to the base. The standard 20 is hollow and is adapted to slidably receive the stem 21 of a horizontal platen 22.

The platen 22 is adapted to be supported in different positions of elevation on the standard by means of a series of lateral holes 23 in the stem, in any one of which a pin 24 may be removably disposed.

The platen 22 is adapted to support a paper cup 25, for example, to be tested. The stem 21 is provided with a series of holes 23 whereupon cups of different sizes are held on the platen at coordinated elevations to provide a uniform basis of measurement, e.g., ⅔ height.

The arms 14 and 15 are urged to pivot inwardly from an initial position by means of a linkage that includes a horizontal lever 27 pivoted at one end to a standard 28 and having weights 29 at the other end. A cable 30 extends from an anchor 31 of the arm 14, passes over a central sheave 32 rotatably mounted on a pin shaft 33 at the top of a standard 34. The cable 30 extends downwardly from the sheave 32 and engages a stirrup 35 secured to the lever 27, thence vertically upward and over another sheave 36 rotatably mounted on the same pin shaft 33. The cable then extends horizontally to an anchor 37 of the other vertical arm 15.

The arms 14 and 15 are maintained in an initial spread position by means of a pair of bell cranks 38 and 39 pivoted to a crossbar 40 by means of pins 41 and 42. The crossbar is secured to the standard 34. The arms are maintained in their initial position by foot members 43, 43 secured to the lower ends of the arms and having adjustable abutments 44, 44 adapted to contact the surface of the base member 11.

Vertical links 45, 45 have their lower ends pivoted to the inner ends of the bell cranks 38, 39 by pins 46, 47 and their upper ends co-pivoted to the inner end of a horizontal lever 48 by means of a pin 49. Spaced from the inner end of the lever 48 a fulcrum is provided by means of a bracket 50 secured to the standard 34 and a pin connection 51.

The links 45, 45 are biased downwardly by means of a coil spring 52 having one end connected to one of the links by means of a bolt 53 and the other end anchored to the base of the standard 34 by means of a bolt 54.

Movement of the links 45, 45 under this biasing action causes the outer ends of the bell cranks to move inwardly and thereby permits the arms 14 and 15 to move inwardly under the influence of the weights 29 acting through the cable 30.

Against this biasing action there is provided a dash pot 55 vertically mounted on the standard 28. The movable element 56 of this dash pot is connected to the lever 48 by means of a link 57.

The lever 48 is tripped from an initial position (see FIG. 1) by a mechanism comprising a normally overlying tip 58 of the upper end of a flexible finger 59. The lower end of the finger 59 is secured to a standard 60. The standard 60 is disposed between the lever 48 and the finger 59 and it is provided with an opening 61 for movement of the tip 58. A rocker arm 62 is mounted on a bracket 63 of the standard 60 on the same side as the lever 48. This rocker arm is provided with an adjustable abutment 64 at its upper end which passes through an opening 65 in the standard 60 to contact the finger 59.

The other end of the rocker arm is moved outwardly by means of a lead screw 66 mounted in a boss 67 of the standard 60. A crank 68 is secured to the lead screw 66 for manually rotating it.

A time switch 69 is mounted on a bracket 69A attached to the side of the standard 60 in a position to be actuated by the crank 68 when it is moved to the position for tripping the lever 48. Actuation of the time switch 69 energizes for the period of the switch a solenoid 70 which causes its armature 71 to retract against the action of a spring 72. A brake shoe 73 is attached to the outer end of the armature 71 alongside the outer end of the lever 27.

The solenoid housing 74 is mounted on a bracket 75 of a standard 76 on one side of the lever 27. On the opposite side of the lever there is secured on the standard an offset guide member 77 for the lever 27.

Above and below the lever 27 there are secured extensions 78, 79 within the guide member 77 to register with the brake shoe 73 in different positions of the lever.

Mounted on the arms 14 and 15 are article abutments 80 and 81 which are adapted to contact the article to be tested and through which crushing pressure is applied. These abutments are preferably convex and are secured to the inner ends of rods 82, 83, respectively. The rods are slidably mounted in apertures 84 and 85 of the arms, which apertures are provided with set screws 86 and 87, respectively. Stabilizing rods 88 and 89 are secured to the abutments 80 and 81 and they are slidably disposed in apertures 90 and 91 of the arms 14 and 15, respectively.

At the upper ends of the arms 14, 15 there is carried the measuring means which comprises a bar 92 pivoted to the arm 14 by means of a pin 93. The other end of the bar 92 carries a slot 94 which is slidably engaged with a pin 95 of the arm 15. A bracket 96 extends upwardly from the end of the arm 15 and carries a linear displacement gauge 97. This gauge has a vertical movable member 98 in contact with an elongated wedge 99 mounted on the bar 92.

In operation, the height of the platen 22 is first adjusted by placing the retaining pin 24 in one of the apertures corresponding to the height of the cup.

The abutments 80 and 81 are then adjusted by means of the set screws 86 and 87 and a spacing gauge 100 corresponding to the diameter of a cup to be tested at that elevation, such as a paper or plastic drinking cup 25. The cup 25 is then substituted for the gauge 100. The crank 68 is then rotated to the position where it trips the lever 48 and actuates the time switch 69. Upon release of the lever the biasing action of the spring 52 urges the bell cranks 38 and 39 inwardly against the action of the dash pot 55 thereby permitting the weights 29 on the arm 27 acting through the cable 30 to draw the arms 14, 15 together against the cup. Upon the elapse of a given period as determined by the time switch 69, the electrical circuit is opened, releasing the spring 72 which forces the brake shoe 73 against the arm 27. Thus, all motion is arrested and the extent to which the article has been crushed during the period is indicated on the gauge 97.

What is claimed is:
1. A crushability tester comprising means for supporting an object to be tested in a vertical position, means for applying a crushing force to the object transverse to its vertical support position, means for initiating the crushing force and terminating it in a fixed period and means for determining the degree of crushing effected by the force during the period.

2. A crushability tester as defined by claim 1 and means for attenuating the force during an initial portion of the period.

3. A crushability tester as defined by claim 2 in which the attenuating means comprises a pair of bell cranks pivoted in spaced relation to a fixed member between said arms and actuatable by a movable member pin connected in spaced relation to the inner ends of said bell crank, a force spring tending to move said movable member in one direction and dash pot means tending to resist the force spring.

4. A crushability tester as defined by claim 1 in which the means for applying the crushing force comprises a pair of pivoted arms, a weighted lever, and a cable connecting the lever and arms to urge the arms toward each other.

5. A crushability tester as defined by claim 4 in which each end of the cable is connected to one of the arms and the cable passes through a stirrup on the lever and stationary sheaves for guiding the cables.

6. A crushability tester as defined by claim 4 and releasable means for holding the lever in an initial position against the action of its weight and means for tripping said means to release the lever.

7. A crushability tester as defined by claim 6 in which the means for terminating the crushing force comprises a time switch actuatable by said releasing means to its closed position and a braking mechanism connected to said lever actuatable to braking position when the time switch is opened.

8. A crushability tester as defined by claim 4 in which the means for determining the degree of crushing comprises a bar pivoted to one of the arms and slidably associated with the other arm, a wedge carried by the bar, a displacement gauge carried by the said other arm having a movable member in contact with said wedge.

9. A crushability tester as defined by claim 4 in which the means for applying crushing force to the object includes a pair of convex members connected to the arms and means for adjusting the position of said convex members on said arms.

10. A crushability tester as defined by claim 1 in which the means for supporting an object to be tested comprises a platen having a dependent stem, a hollow fixed standard for slidably receiving said stem, said stem having an array of longitudinal apertures adapted each to removably receive an abutment pin for contacting the upper end of the standard, to position the stem in different vertical positions on the standard.

References Cited
UNITED STATES PATENTS

| 2,760,370 | 8/1956 | Linhorst | 73—94 |
| 2,922,302 | 1/1960 | Kerman | 73—88 |

RICHARD C. QUEISSER, Primary Examiner

JERRY W. MYRACLE, Assistant Examiner

U.S. Cl. X.R.

73—100